United States Patent [19]

Mathieu

[11] Patent Number: 4,548,666
[45] Date of Patent: * Oct. 22, 1985

[54] METHOD FOR FORMING A RAILWAY CENTER PLATE LINER

[75] Inventor: Julien C. Mathieu, Waynesville, N.C.

[73] Assignee: Dayco Corporation, Dayton, Ohio

[*] Notice: The portion of the term of this patent subsequent to Jul. 27, 1999 has been disclaimed.

[21] Appl. No.: 604,411

[22] Filed: Apr. 30, 1984

Related U.S. Application Data

[60] Continuation of Ser. No. 362,803, Mar. 26, 1982, abandoned, Division of Ser. No. 179,192, Aug. 18, 1980, Pat. No. 4,341,162.

[51] Int. Cl.⁴ .............................. B32B 31/04
[52] U.S. Cl. .................. 156/245; 105/199 C; 105/199 CB; 384/153; 384/297; 384/300; 156/293
[58] Field of Search ............ 156/245, 293, 294; 264/257, 267; 428/492, 517; 105/199 C, 199 CB; 384/125, 126, 183, 276, 297, 300

[56] References Cited

U.S. PATENT DOCUMENTS

| | | | |
|---|---|---|---|
| 2,809,130 | 10/1957 | Rapport | 384/300 |
| 3,037,893 | 6/1962 | White | 384/297 |
| 3,107,953 | 10/1963 | Palm | 384/153 |
| 3,986,752 | 10/1976 | Bogar et al. | 105/199 C |
| 4,075,951 | 2/1978 | Chierici et al. | 105/199 C |
| 4,090,750 | 5/1978 | Wiebe | 105/199 C |
| 4,103,624 | 8/1978 | Hammonds et al. | 105/199 C |
| 4,108,080 | 8/1978 | Garner et al. | 105/199 CB |
| 4,159,298 | 6/1979 | Bainard | 264/268 |
| 4,188,888 | 2/1980 | Cooper et al. | 105/199 C |
| 4,237,793 | 12/1980 | Holden et al. | 384/297 |
| 4,289,077 | 9/1981 | Kleykamp | 105/199 C |
| 4,300,970 | 11/1981 | Honda et al. | 156/245 |
| 4,330,498 | 5/1982 | Kleykamp | 105/225 |
| 4,398,989 | 8/1983 | Allen et al. | 156/245 |
| 4,415,391 | 11/1983 | Reid | 156/245 |

Primary Examiner—Caleb Weston
Attorney, Agent, or Firm—Joseph V. Tassone

[57] ABSTRACT

A wear resistant liner for use between a center plate of a body bolster and a bolster bowl of a truck bolster of a railway vehicle is provided wherein such liner comprises a polymeric laminate comprised of a first material which is adapted to reduce load concentration against a peripheral annular flange of the bolster bowl and a second material which provides an antifriction surface engaging the flange with the laminate resulting in an increased operating life for such flange.

2 Claims, 10 Drawing Figures

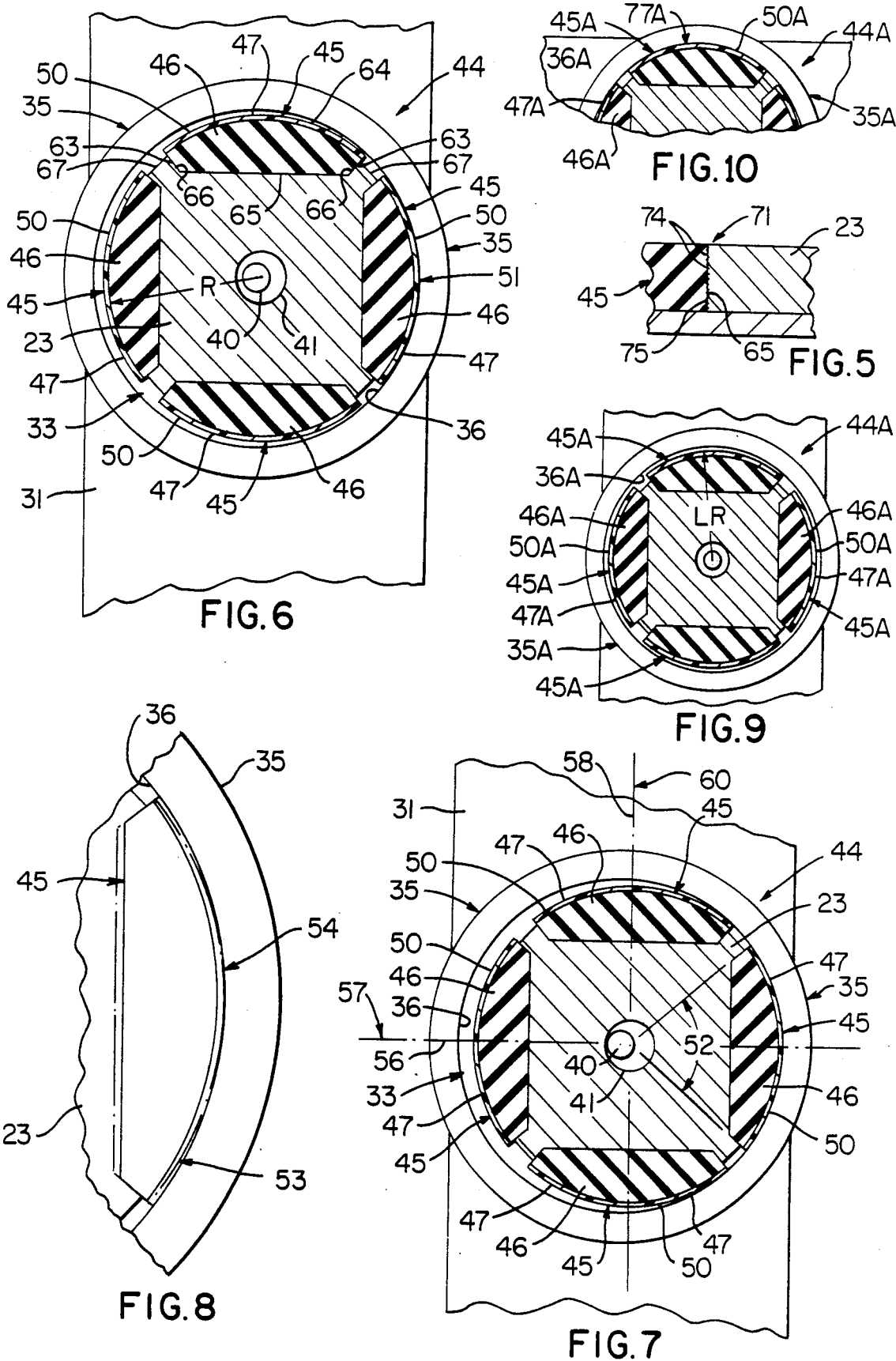

— 4,548,666 —

METHOD FOR FORMING A RAILWAY CENTER PLATE LINER

CROSS REFERENCE TO RELATED PATENT APPLICATION

This application is a continuation of Ser. No. 362,803 filed Mar. 26, 1982, abandoned, which in turn is a divisional of Ser. No. 179,192 filed Aug. 18, 1980, now U.S. Pat. No. 4,341,162.

BACKGROUND OF THE INVENTION

1. Field of the Invention

This invention relates to railway vehicles and in particular to liners for center plate structures thereof.

2. Prior Art Statement

Railway vehicles including locomotives, railway cars, and the like, are each usually comprised of a main vehicle body which has body bolsters at opposite ends thereof and each body bolster has a body center plate which serves to transfer the load of the body at its associated end of the car to an associated truck which rides on railway tracks and each truck is provided with a truck bolster and a bolster bowl defined by a truck center plate having an upstanding peripheral annular flange. Each railway vehicle body center plate is received within the confines of the flange of an associated bolster bowl and the entire load of the car body is transmitted through its body bolster center plates. During normal operation, the center plates and associated parts are subjected to substantial operating loads and such center plates and parts are also subjected to various foreign objects and require repeated expensive lubrication and comparatively frequent replacement of worn and damaged parts.

In addition to the substantially high vertical loads between the body center plates and truck center plates, there are substantially high horizontal loads exerted by each body center plate against the above-mentioned upstanding peripheral annular flange defining the bolster bowl. The main thrust of previous efforts has been to provide a wear member or liner between the center plate structures without providing special means in such liner for reducing any load concentration against the above-mentioned flange.

One example of a liner for center plate structure which uses a polymeric antifriction material and has reinforcing material embedded therein is disclosed in U.S. Pat. No. 4,188,888. Another example of such a liner is a bowl-shaped liner, which consists of a disc portion and an adjoining flange portion made of a separate segmented strip, and is disclosed in U.S. Pat. No. 4,075,951.

However, the problem of reducing load concentration or concentrated loads exerted against an upstanding peripheral annular flange of a truck holder bowl has not been solved in a satisfactory manner.

SUMMARY

It is a feature of this invention to provide an improved wear resistant liner means or liner for use between a center plate of a body bolster and a bolster bowl of a truck bolder of a railway vehicle wherein such liner basically solves the problem of reducing load concentration or concentrated loads exerted against an upstanding peripheral annular flange of such truck bolster bowl.

Another feature of this invention is to provide a liner of the character mentioned comprised of a polymeric laminate which comprises a first material which is adapted to reduce load concentration against the flange and a second material which provides an antifriction surface engaging such flange, with the first and second materials cooperating to provide an increased operating life for the flange.

Another feature of this invention is to provide a liner of the character mentioned wherein the first material of the laminate is a rubber which defines the inner portion of such laminate and serves as a shock absorber or cushion.

Another feature of this invention is to provide a liner of the character mentioned wherein the first material of the laminate is a rubber which defines the inner portion of such laminate and upon being subjected to a load such rubber is elastically deformed and displaced to provide a larger support area for the railway vehicle body bolster center plate which serves to distribute the load over the larger support area thereby reducing the load concentration.

Another feature of this invention is to provide a liner of the character mentioned wherein the above-mentioned second material is an ultra high molecular weight polymeric material which defines the outer portion of the laminate and the second material has an exposed surface defining the antifriction surface.

Another feature of this invention is to provide a liner of the character mentioned wherein the ultra high molecular weight polymeric material is polyethylene.

Another feature of this invention is to provide a liner of the character mentioned comprised of a plurality of laminates which are substantially identical to the above-described laminate and wherein the plurality of substantially identical laminates are in the form of pads. The pads are supported by the body center plate and two of the pads are disposed with their central axes at diametrically opposed positions and in substantial alignment with a longitudinal axis which coincides roughly with fore and aft positions of the railway vehicle to thereby help cushion the load concentration caused by fore or aft impact loads involving the vehicle and with the remaining two of the pads being disposed with their central axes aligned on a transverse axis disposed approximately 90° from the longitudinal axis.

Another feature of this invention is to provide a liner of the character mentioned in which the pads have outside surfaces defining antifriction surfaces with each antifriction surface having a radius which is substantially equal to the inside radius of the right circular cylindrical inside surface of its associated truck bolster bowl flange whereby the entire antifriction surface of each pad serves as a bearing surface thereby reducing load concentration against the flange.

Another feature of this invention is to provide an improved method of making a liner of the character mentioned.

Therefore, it is an object of this invention to provide an improved liner and method of making the same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which

FIG. 5 is a view similar to FIG. 4 illustrating another exemplary embodiment of the holding means;

FIG. 6 is a view similar to FIG. 3 and illustrating a typical pad in contact with the inside surface of the upstanding peripheral annular flange of the truck bolster bowl free of loading between the pad and flange;

FIG. 7 is a view similar to FIG. 6 and illustrating the above-mentioned typical pad in contact with the inside surface of the upstanding peripheral annular flange of the truck bolster bowl with loading between the pad and flange;

FIG. 8 is a view similar to FIG. 6 illustrating the typical pad in contact with the inside surface of the upstanding peripheral annular flange of the truck bolster bowl with a load exerted between the pad and flange and particularly highlighting, by solid lines, the manner in which the entire outside surface of the pad engages the flange and serves to reduce load concentration against the flange and also highlighting, by dot-dash lines, the unloaded position of the pad;

FIG. 9 is a view similar to FIG. 3 illustrating another exemplary embodiment of the liner means of this invention; and FIG. 10 is a fragmentary view showing a side edge portion of a typical unloaded pad of the liner means of FIG. 8 rotated ninety degrees.

DESCRIPTION OF ILLUSTRATED EMBODIMENTS

Figure 1:
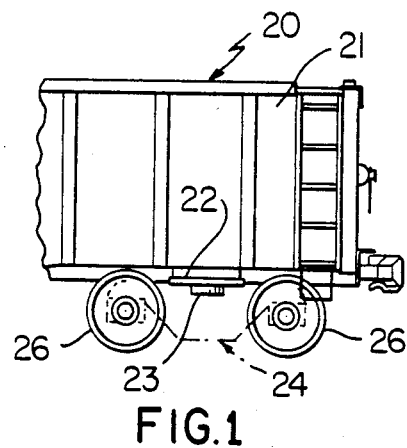
FIG. 1 is a fragmentary view in elevation illustrating one end portion of an exemplary railway vehicle in the form of a railroad car and showing the wheels of the associated truck at the one end and the remainder of such truck in dot-dash lines and particularly illustrating the location of the associated car body center plate.

Reference is now made to FIG. 1 of the drawings which illustrates an end portion of an exemplary railway vehicle, in the form of a railway car, which is designated generally by the reference numeral 20. The car 20 has a car body 21 and a pair of body bolsters at opposite ends thereof with only one bolster 22 being illustrated. Each body bolster 22 has a body center plate 23 and, as is known in the art, the entire load of the car body 21 is carried through its bolsters 22 and body center plates 23 to railway car trucks 24 at opposite ends of the car body 21.

Only one car truck 24 is shown in FIG. 1, with the major portion thereof being shown by dot-dash lines for simplicity and ease of presentation. A fragmentary portion of the truck 24 is illustrated in perspective view in FIG. 1; and, the following description of the truck 24 is fully applicable to both trucks 24 of the railway car 20.

The truck 24 is comprised of four wheels 26, with fragmentary portions of only three of such wheels being illustrated, and an axle 27 extends between each associated pair of wheels 26. The truck 24 has a structural frame assembly 30 carried by the axles 27 and such axles are freely rotatable while carrying the frame assembly 30. The frame assembly 30 carries a truck bolster 31, as is known in the art, employing resilient mounting means shown as compression spring sets 32 at opposite sides of the truck 24.

Figure 2:
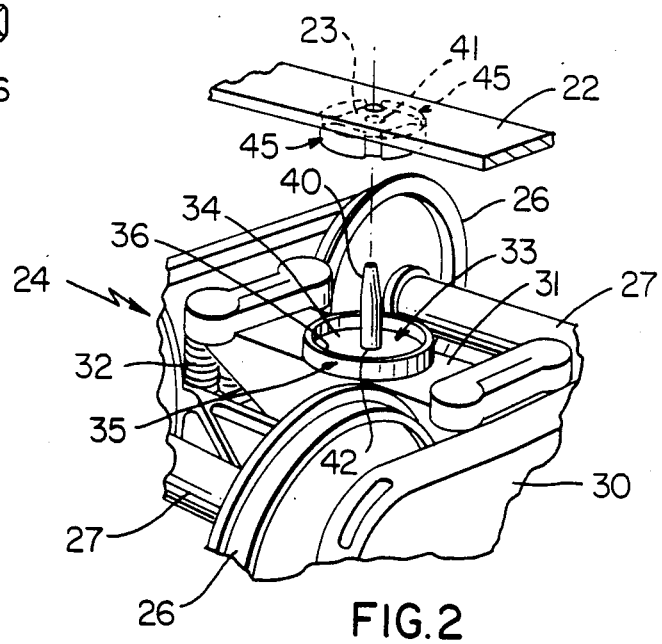
FIG. 2 is a perspective view with parts in cross section, parts in elevation, and parts broken away particularly illustrating a body bolster and body center plate with liner means of this invention attached thereto; a truck bolster with its bolster bowl defined by a truck center plate having an upstanding peripheral annular flange; and a center pin associated with the center plates.

As best seen in FIG. 2 of the drawings, the truck bolster 31 comprises a bolster bowl, which is designated generally by the reference numeral 33, and the bowl 33 is defined by a truck center plate 34 which has an upstanding peripheral annular flange 35. During normal operation of the railway vehicle or car 20, the body center plate 23 is received concentrically within the confines of the flange 35 and is supported by the truck center plate 34 and flange 35.

The truck center plate 34 has a substantially planar and horizontally disposed top supporting surface and the peripheral annular flange 35 provided around the truck center plate 34 has a right circular cylindrical inside surface 36. Once the body center plate 23 is within the bolster bowl 33 of the truck bolster 31, the entire load of the railway car body (horizontal and vertical) is carried by the body center plate 23 and the truck center plate 34 and peripheral annular flange 35.

The railway car 20 has a center pin 40, which is also referred to in the art as a king bolt or pin 40, associated with each truck 24. The upper portion of each pin extends through a right circular cylindrical bore 41 which extends through its body center plate 23 and continues into its body bolster 22. The lower portion of each pin 40 extends through its truck center plate 34 and continues into its truck bolster 31 through a bore 42.

Each truck 24 turns about its associated center pin 40 and there are substantial clearances between each pin 40 and its associated bores 41 and 42 to allow unobstructed turning. In addition, the clearances are such that center plate 23 may carry a liner means 44 of this invention (to be subsequently described) and provide free operation of such liner means in an unobstructed manner. Thus, as is known in the art, the center pin 40 serves as a safety pin but it is not used in carrying or transmitting loads between the body center plate 23 and the components of the bolster bowl 33 of an associated car truck 24.

As previously indicated in the prior art statement, in this specification, there are high or large horizontal loads exerted against the upstanding peripheral annular flange 35 comprising the truck bolster bowl 33 and such loads may be in the form of sustained loads which are produced when the railway car 20 is being either pushed or pulled. However, the largest of such loads are often in the form of comparatively high impact loads caused by the car striking or being struck by other vehicles during coupling, uncoupling, and the like. Regardless of how loads against a flange 35 are produced, there has been a tendency (prior to this invention) to provide a substantial load concentration against the flange 35, i.e., the total force or load has been applied previously against a small unit area of the inside surface 36 of the flange 35.

Figure 3:
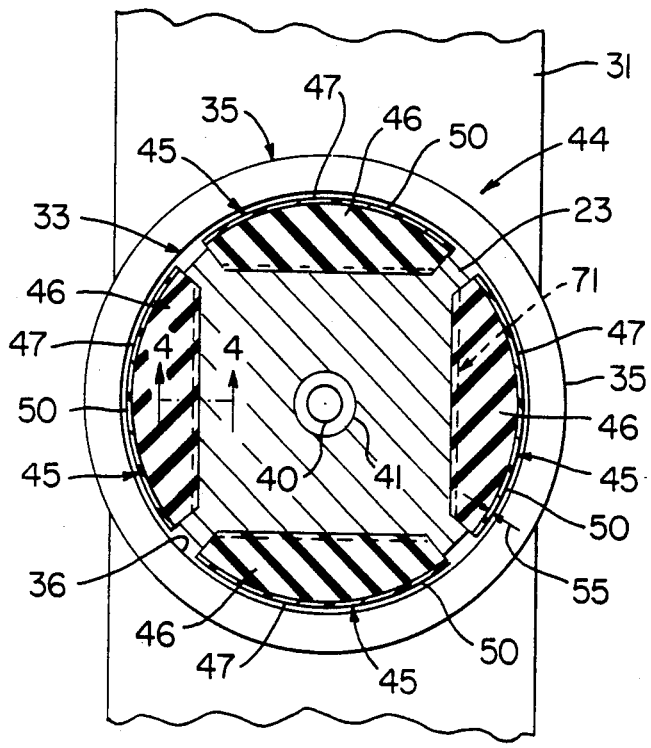
FIG. 3 is an enlarged plan view with parts in cross section, parts in elevation, and parts broken away particularly illustrating a body center plate disposed centrally within a bolster bowl of a truck bolster without loads being applied thereagainst and particularly illustrating liner means of this invention in the form of four substantially identical laminates or pads.

In accordance with the teachings of this invention, the previously mentioned wear resistant liner means 44 (FIG. 3) is provided for use between the center plate 23 of the body bolster 22 and the bolster bowl 33 of the truck bolster 31. The liner means 44 of this example comprises a plurality of polymeric laminates which are substantially identical and each of such laminates will be designated generally by the reference numeral 45 and will be referred to interchangeably as a laminate or pad 45.

Each laminate or pad 45 is comprised of a first material 46 which is adapted to reduce load concentration against the flange 35 and a second material 47 which provides and has an antifriction surface 50 thereof engaging flange 35 and in particular engaging the right circular cylindrical inside surface 36 of such flange. The materials 46 and 47 are suitably fixed or bonded together to define a two-ply polymeric laminate and cooperate so as to result in an increased operating life for the flange.

The first material 46 comprising each pad 45 of this example is a rubber material defining the inner portion of the pad and upon being subjected to high load the rubber material 46 is elastically deformed and displaced to provide a larger support area for the body center plate 23 which serves to distribute the applied load over the larger support area thereby reducing the load concentration. The rubber material may be of any suitable rubber compound which is preferably compounded to provide the desired results of distributing forces over a substantial area.

To highlight this matter of elastic deformation and displacement of the rubber material, reference is first made to FIG. 6 of the drawings where an unloaded and hence uncompressed pad 45 is shown which has its antifriction outside surface 50 engaging the right circular cylindrical inside surface 36 of the flange 35 as shown at 51. Reference is next made to FIG. 7 which shows the same pad 45 subjected to a load. The load causes elastic deformation and displacement of the rubber 46 causing some reduction in rubber thickness in the center of the pad 45 and some displacement of the opposite portions of the pad resulting in movement of the rubber 46 and material 47 so that the entire area of the outside surface 50 contacts the surface 36 and as indicated by the contact arc 52 in FIG. 7. This large contact arc provides a larger support area over which to distribute the total load thereby reducing any load concentration against a small portion or small unit area of the flange 35. This reduced load concentration results in minimum tendency for the flange 35 to be subjected to localized loads such as localized impact loads which would tend to crack or break the flange 35.

This action of the rubber 46 in reducing load concentrations is also illustrated in FIG. 8 where the unloaded condition of the pad 45 of FIG. 6 is shown by showing the outside surface of such pad by dot-dash lines at 53; and, the loaded condition of the pad 45 of FIG. 8 is shown by showing the outside surface of such pad by a solid line at 54. It will be noted that the entire outside surface of the loaded pad 45 engages the surface 36.

As previously mentioned, each pad 45 has the second polymeric material 47 comprising same, and in particular the outer portion thereof. The second material is preferably in the form of an ultra high molecular weight polymeric material such as polyethylene. The polyethylene 47 has a substantially uniform thickness as shown at 55 (FIG. 3) and its outside surface defines the antifriction surface 50 of the pad.

In accordance with the teachings of this invention, two of the pads 45 are disposed with their central axes (defined as the axes 56, shown in FIG. 7, which intersect the central axis of their body bolster 23) at diametrically opposed positions relative to the body center plate 23 and with their axes 56 in substantial alignment with a longitudinal axis 57 which coincides roughly with fore and aft positions of the railway vehicle or car 20 to thereby help cushion the load concentration caused by fore and aft impact loads involving the vehicle or car 20. The remaining two of the pads 45 are disposed with their central axes 58 aligned on a transverse axis, shown at 80, disposed approximately 90° from the above-mentioned longitudinal axis 57.

Each pad 45 has a special configuration which will now be described in connection with FIG. 6. Each pad when viewed from an end thereof or when viewing a corresponding cross section has the appearance of a truncated sector of a circle and thereby has two radially diverging sides 63, an outer arcuate surface 64 (of a particular radius) adjoining the outer edges of the sides, and an inner surface 65 adjoining the inner edges of the diverging sides 63. The radially diverging sides 63 of each pad 45 are supported by cooperating surfaces 68 of the body center plate 23 which are provided on structural extensions 67 of the body center plate 23.

During the compressing action against the rubber material 46 and laminated polyethylene 47 caused by high loads, there is a tendency for the rubber 46 in the central portion of each pad 45 to be reduced in radial dimension. Simultaneously, the outer portions of the rubber material 46 of the pad, in essence, tend to ride out on the surfaces 66 which act as cam surfaces. The net effect is to move the outer portions of the rubber in the pad and the entire surface 50 against surface 36. The final result of this action is to provide a larger bearing support area for the body center plate 23 against surface 36 and a minimum tendancy to damage the flange 35.

It will be appreciated that the rubber 46 of a compressed pad 45 is substantially confined with the pad in the position shown at the right side of FIG. 7. Because rubber has small cubic compressibility when confined, it acts as described above to help provide the larger bearing support area.

Each pad or laminate 45 has means 71 holding same against movement relative to its associated body center plate 23. In the example illustrated in FIGS. 3 and 4, the holding means 71 comprises a recess or groove 2 extending inwardly in the rubber 46 from the inner surface 65 (which is in the form of a substantially planar surface 65) and a cooperating projection 73 extending from center plate 23. The projection 73 is particularly adapted to be received within the groove 72 and the groove extends continuously across the full dimension of the inner surface 65 between the inner edges of the diverging sides 63. The cooperating projection 73 extends in a corresponding manner from the body center plate 23. The holding means 71 holds its pad 45 against vertical movement relative to the body center plate 23. Each pad 45 would probably move horizontally away from its body center plate 23 with the center plate 23 away from its truck bolster bowl 33; however, such horizontal movement is prevented because each pad 45 is basically confined by surface 36 once the center plate 23 is within its bolster bowl 33.

It may be preferred in some applications of this invention to hold each pad firmly in position against all types of movements. For example, FIG. 5 illustrates such holding means, which is also designated by the general reference numeral 71. The holding means 71 of FIG. 5 comprises adhesive means shown as an adhesive by spaced dots 74. The adhesive 74 acts between the inner surface 65 and a substantially planar surface 75 of the body center plate 23 which is urged against the planar surface 65 of the pad 45.

Reference is now made to FIGS. 9 and 10 of the drawings which illustrate another exemplary embodiment of the liner means or liner of this invention. The liner means or liner of FIGS. 9–10 is very similar to the liner 44 therefore, such liner will be designated by the reference numeral 44A and representative parts of such liner which are similar to corresponding parts of the liner 44 will be designated in the drawings by the same reference numerals and as in the liner 44 followed by the letter designation A and not described again in detail.

Before proceeding with the description of liner 44A it should be understood that the pads 45 of the liner means 44 are disposed so that their outside antifriction surfaces 50 are on a common circumference with such common circumference having a particular radius which is indicated by the reference letter R in FIG. 6. For a particular pad 45 of a liner 44 the radius R is less than the radius of the right circular cylindrical inside surface 36 of the associated flange 35.

The liner means or liner 44A also has pads 45A each made of an inner rubber material 46A and outer high molecular weight polymeric material 47A with each pad having an antifriction outside surface 50A. However, each outside surface 50A has a radius LR which is larger than the radius R. Actually, the radius LR is equal to the radius of the right circular cylindrical inside surface 36A of the associated flange 35A. It will be appreciated that with this construction the surfaces 50A do not lie on a common circumference as is the case with the surfaces 50 of the pads 45. Further, with this construction and arrangement the entire antifriction surface 50A of each pad 45A serves as a bearing surface thereby reducing load construction against the flange whereby with each pad 45A it is not necessary to rely on displacement of the opposed end portions of each pad.

The above-described arrangement is shown at 77A in FIG. 10 which illustrates a particular pad 45A subjected to a load and it is seen that its entire antifriction surface 50A is disposed firmly against the inside surface 36A of the flange 35A thereby reducing load concentration against flange 35A which results in increased operating life for such flange 35A in a similar manner as previously described. It will be appreciated that under high load conditions with the surface 50A having a radius equal to the radius of the right circular cylindrical surface 36A the effect is to compress the entire rubber material 46A slightly without relying on any displacement of rubber material to help provide an increased bearing surface area However, regardless of whether liner means 44 or 44A is being utilized, the pads comprising a particular liner means in each instance utilizes the rubber component thereof as a shock absorber and as a means of distributing the load. As explained earlier, in each instance the rubber is adapted to reduce load concentration against is associated flange, 35 or 35A, and the outside surface of the associated ultra high molecular weight polymeric material provides an antifriction surface engaging the flange whereby the overall result is in an increased operating life for the flange.

Each material 47 and 47A is an ultra high molecular weight polymeric material, such as polyethylene, as previously mentioned; however, any suitable ultra high molecular weight material may be used for this purpose. In addition, it will be appreciated that the molecular weight referred to is a molecular weight of at least 2 million. The preferred molecular weight is in the range of 2 to 5 million and may be much greater than 5 million. Further, it is to be understood that this reference to molecular weight means average molecular weight. In addition, the technique for the determining molecular weight is referred to as the intrinsic viscosity test and is widely used in the United States.

As indicated earlier, the rubber material 46 or 46A may be any suitable material capable of providing the desired performance and may be any suitable rubber compound. One rubber that appears to have potential in defining each pad 45 or 45A is an ethylene-propylene polymer rubber having a durometer hardness generally of the order of 80 as measured on the "A" scale. A particular example of such an ethylele-propylene polymer rubber is sold under the registered trademark of "NORDEL" by the Elastomer Chemicals Department of the E. I. DuPont de Nemours and Company, Inc., Wilmington, Del., 19898.

In this disclosure of the invention, a plurality of four pads 45 or 45A are illustrated as being used, and the pads of a particular liner means or liner are substantially identical. By making the pads substantially identical, a single part number may be stocked for a particular type or railway car. However, it will be appreciated that in some applications of this invention, it may be desired to provide pads which take the fore and aft loads which are larger in volume and overall size than the pads that take the transverse loads.

It will also be appreciated that instead of providing liner means in the form of a plurality of laminates or pads such liner means may be comprised of a single substantially annular laminate or pad having an outer portion or layer of ultra high molecular weight polymeric material and an inner portion or layer of rubber. The inner rubber portion may be made as a single-piece structure of special configuration or may be a plurality of pieces. However, regardless of how made the rubber should be such that it may be elastically deformed in place in the manner previously described so as to provide results essentially as outlined above.

In this disclosure of the invention, a disc-like center plate liner is not disclosed as being provided between the horizontal surfaces of the body center plate 23 and the horizontal surface of the truck center plate 34. However, it will be appreciated that a suitable liner or lubrication may be provided at this location. Preferably a liner of the type disclosed in U.S. Pat. No. 4,188,888 would be provided with such liner being in the form of a disc with a right circular cylindrical outside surface, planar surfaces disposed in spaced parallel relation, and a central bore for receiving the center pin therethrough.

Each wear resistant liner or pad 45 and 45A may be made by suitably forming and/or laminating the polymeric material to define the pad. The forming may be achieved by molding using suitable mold devices and equipment with each mold device being constructed with special walls to define each overall pad or portions of components of each pad, as is known in the art. The molding action may be a forming-curing action during which rubber may be simultaneously formed and cured against an inside surface of the ultra high molecular weight (UHMW) polymeric material. Further, as is known in the art, a high-strength tenacious bond is provided between the UHMW material and rubber at the interface thereof during the forming-curing process.

As previously indicated, each pad or laminate has means holding same against movement relative to its associated body center plate and in this disclosure the holding means comprises a recess or groove in the rubber and a cooperating projection extending from the center plate. In the disclosure of FIG. 5 the holding means is in the form of an adhesive. However, it is to be understood that any suitable holding means may be employed including an additional member such as a snap ring, or the like, which may be disposed in cooperating facing grooves provided in each pad and in the center plate.

Figure 4:
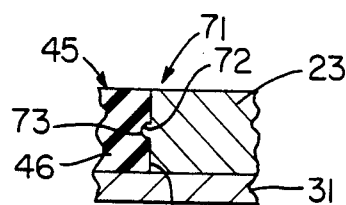
FIG. 4 is an enlarged fragmentary cross-sectional view taken essentially on line 4—4 of FIG. 3 and particularly illustrating means holding a typical pad against vertical movement relative to the body center plate.

In this disclosure of the invention, each pad is provided with an inner surface which is a substantially planar surface. For example, the inner surface of the pad 45, illustrated in FIG. 4, is a substantially planar surface; however, it will be appreciated that such inner surface may be in the form of an arcuate surface or a cylindrical surface as desired.

While present exemplary embodiments of this invention, and methods of practicing the same, have been illustrated and described, it will be recognized that this invention may be otherwise variously embodied and practiced within the scope of the following claims.

What is claimed is:

1. In a method of making a bolster arrangement for a railway vehicle comprising the steps of, providing a center plate that is secured to the body bolster of the car body of said vehicle, providing a bolster bowl for the truck body of said vehicle so that said bolster bowl has an upstanding annular flange, disposing said center plate in said bolster bowl so that said center plate is received within said flange, forming polymeric material to define liner means and disposing said liner means so as to be between said center plate and said annular flange when said center plate is received in said annular flange, the improvement in said method wherein said forming step comprises forming said liner means in the form of a plurality of pads as a deformable polymeric laminate comprised of a first deformable polymeric material comprising rubber which is adapted to reduce load concentration against said flange and a second deformable ultra high molecular weight polymeric material which provides an antifriction surface between said body center plate and flange, said forming step causing said first material to be an inner part of said liner means and said second material to be an outer part of said liner means, said forming step acting to simultaneously form and cure said first material against an inside surface of said second material and form a tenacious bond between said first material and said second material, said laminate resulting in an increased operating life for said peripheral flange because said laminate is adapted to deform into the contour of said flange.

2. A method as set forth in claim 1 in which said forming step comprises molding said liner means in a mold device.

* * * * *